US008631471B2

(12) United States Patent
Dattagupta et al.

(10) Patent No.: US 8,631,471 B2
(45) Date of Patent: Jan. 14, 2014

(54) AUTOMATED SEAMLESS RECONNECTION OF CLIENT DEVICES TO A WIRELESS NETWORK

(75) Inventors: Siddhartha Dattagupta, Irvine, CA (US); Aaron Hyman Averbuch, Seattle, WA (US); Craig A. Hobbs, Seattle, WA (US); Dan Nguyen, Huntington Beach, CA (US); Eu Chong Son, Aliso Viejo, CA (US); Flemming Kraglund, Frederiksberg (DK)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 13/159,271

(22) Filed: Jun. 13, 2011

(65) Prior Publication Data
US 2012/0317619 A1  Dec. 13, 2012

(51) Int. Cl.
*H04L 29/06* (2006.01)
(52) U.S. Cl.
USPC .................. 726/4; 726/3; 380/270; 713/151
(58) Field of Classification Search
None
See application file for complete search history.

(56) References Cited

U.S. PATENT DOCUMENTS

| 7,583,684 | B2* | 9/2009 | Cheng | 370/401 |
| 2004/0067736 | A1* | 4/2004 | Kamma | 455/41.2 |
| 2006/0067290 | A1* | 3/2006 | Miwa et al. | 370/338 |
| 2006/0165103 | A1* | 7/2006 | Trudeau et al. | 370/401 |
| 2008/0220741 | A1* | 9/2008 | Hung | 455/411 |

* cited by examiner

*Primary Examiner* — Jung Kim
*Assistant Examiner* — Robert Leung
(74) *Attorney, Agent, or Firm* — Patterson & Sheridan, LLP

(57) ABSTRACT

A host device for a wireless network may be configured to implement at least two virtual access points for connecting client devices to the wireless network. A user virtual access point enables a client device to connect to the wireless network and transmit network traffic to other devices connected to the wireless network. In addition, a setup virtual access point provides an additional access point to connect to the wireless network when network credentials for the user virtual access point, such as a service set identifier (SSID) or a password, are changed by a user. When a client device cannot find the user virtual access point based on a stored SSID or password, the client device may be configured to automatically reconnect to the setup virtual access point to request a new SSID and network credentials for the user virtual access point.

21 Claims, 8 Drawing Sheets

AUTOMATED SEAMLESS RECONNECTION OF CLIENT DEVICES TO A WIRELESS NETWORK

BACKGROUND

1. Technical Field

The present disclosure relates generally to wireless networks and, more specifically, to automated seamless reconnection of client devices to a wireless network.

2. Description of the Related Art

Home networks, in which multiple computing and/or peripheral devices are communicatively linked together in a consumer's home, are becoming increasingly ubiquitous. A home environment may include one or more computers, a wireless router, a dsl modem, and one or more other devices capable of connecting to the home network. Conventionally, each device in the home network must be individually configured to connect to the network and, once configured, may then communicate with each of the other devices attached to the home network.

Many users choose to secure their home network by establishing network credentials for connecting to a wireless access point associated with the home network. For example, many consumer wireless routers are preconfigured to implement various security protocols such as the Wired Equivalent Privacy (WEP), Wi-Fi™ Protected Access (WPA), Wi-Fi™ Protected Access II (WPA2) or the like. These security protocols may enable a user of the home network to associate a password with a particular wireless access point identified via a service set identifier (SSID). For example, WPA2 defines a pre-shared key (WPA2-PSK) mode that enables a user to define a password using between 8 and 63 ASCII characters, which is then provided to a key derivation function to generate a 256-bit encryption key used to encode data packets transmitted over the wireless access point.

Conventionally, to connect a client device to the wireless access point protected with one of the security protocols described above, a user may be required to select the SSID associated with the secure wireless access point from a list of broadcast SSIDs (or manually enter the SSID) and enter the password associated with the secure wireless access point. The client device then uses the SSID and password to establish a connection with the wireless access point. Client devices may also store the SSID and password to automatically reconnect to the secure wireless access point whenever the client device is within range of the wireless router that provides the wireless access point. However, if a user changes the network credentials, such as by changing the SSID or password associated with the secure wireless access point, each device that connects to the wireless home network will need to be manually reconfigured with the new SSID and password.

Accordingly, there is a need in the art for systems and methods that enable client devices to automatically and seamlessly reconnect to the secure wireless access point.

BRIEF DESCRIPTION OF THE DRAWINGS

So that the manner in which the features of the present disclosure can be understood in detail, a more particular description may be had by reference to example embodiments, some of which are illustrated in the appended drawings. It is to be noted, however, that the appended drawings illustrate only example embodiments and are therefore not to be considered limiting of its scope, for the disclosure may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

Figure 1A:
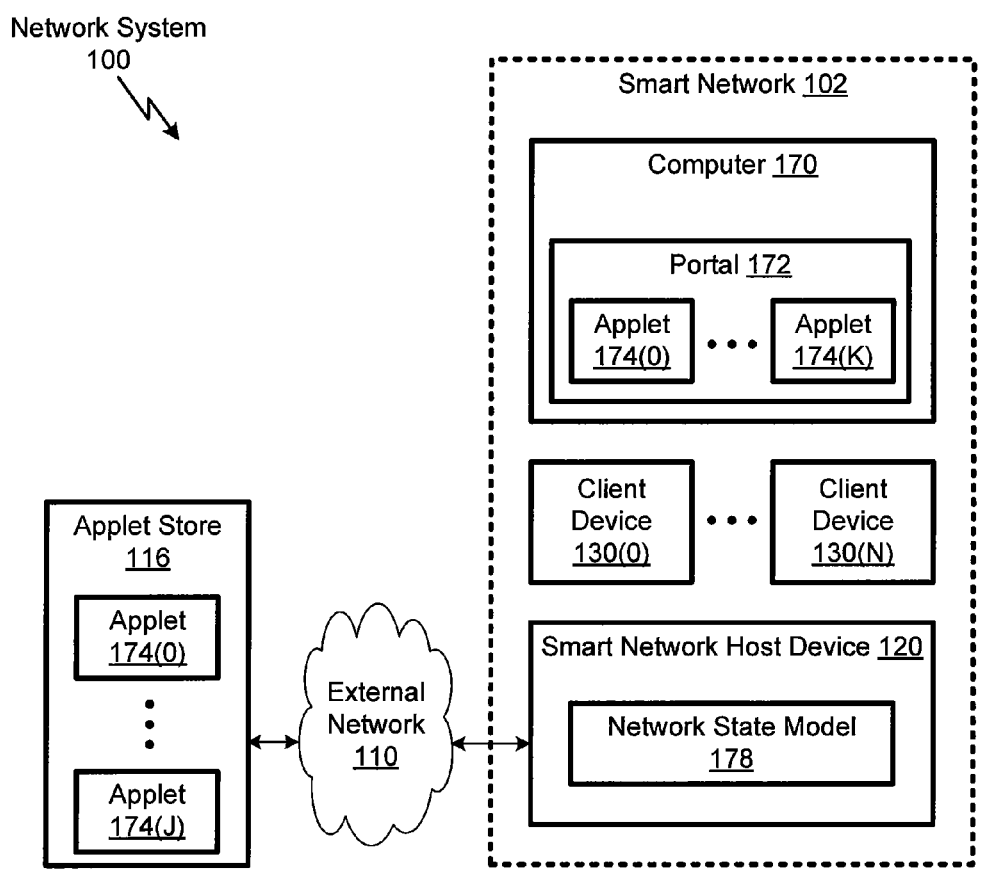
FIG. 1A is an exemplary illustration of an overarching network system configured to implement one or more aspects of the present invention.

In the following description, numerous specific details are set forth to provide a more thorough understanding of various example embodiments. However, it will be apparent to one of skill in the art that certain embodiments may be practiced without one or more of these specific details. In other instances, well-known features have not been described in order to avoid obscuring the disclosure.

Overview

One example embodiment of the present invention sets forth a method comprising the steps of establishing a connection between a wireless access point and a client device via a first virtual access point that is associated with a first service set identifier (SSID) and a first authentication key, receiving a request to transmit to the client device a second SSID and a second authentication key that are associated with a second virtual access point, and determining whether the client device is authorized to connect to the second virtual access point. If the client device is not authorized to connect to the second virtual access point, then the steps further include causing the connection with the client device to terminate. However, if the client device is authorized to connect to the second virtual access point, then the steps further include transmitting the second SSID and the second authentication key to the client device to enable the client device to connect to the second virtual access point.

Another example embodiment of the present invention sets forth a computer-readable medium including instructions that, when executed by a processing unit, cause the processing unit to perform the steps of establishing a connection between a wireless access point and a client device via a first virtual access point that is associated with a first service set identifier (SSID) and a first authentication key, receiving a request to transmit to the client device a second SSID and a second authentication key that are associated with a second virtual access point, and determining whether the client device is authorized to connect to the second virtual access point. If the client device is not authorized to connect to the second virtual access point, then the steps further include causing the connection with the client device to terminate. However, if the client device is authorized to connect to the second virtual access point, then the steps further include transmitting the second SSID and the second authentication key to the client device to enable the client device to connect to the second virtual access point.

Yet another example embodiment of the present invention sets forth a system comprising a client device and a wireless access point that implements two or more virtual access points. The wireless access point is configured to establish a connection between the wireless access point and the client device via a first virtual access point that is associated with a first service set identifier (SSID) and a first authentication key, receive a request to transmit to the client device a second SSID and a second authentication key that are associated with a second virtual access point, and determine whether the client device is authorized to connect to the second virtual access point. If the client device is not authorized to connect to the second virtual access point, then the wireless access point is configured to cause the connection with the client device to terminate. However, if the client device is authorized to connect to the second virtual access point, then the wireless access point is configured to transmit the second SSID and the second authentication key to the client device to enable the client device to connect to the second virtual access point.

Detailed Description of the Figures

FIG. 1A is an exemplary illustration of an overarching network system 100 configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
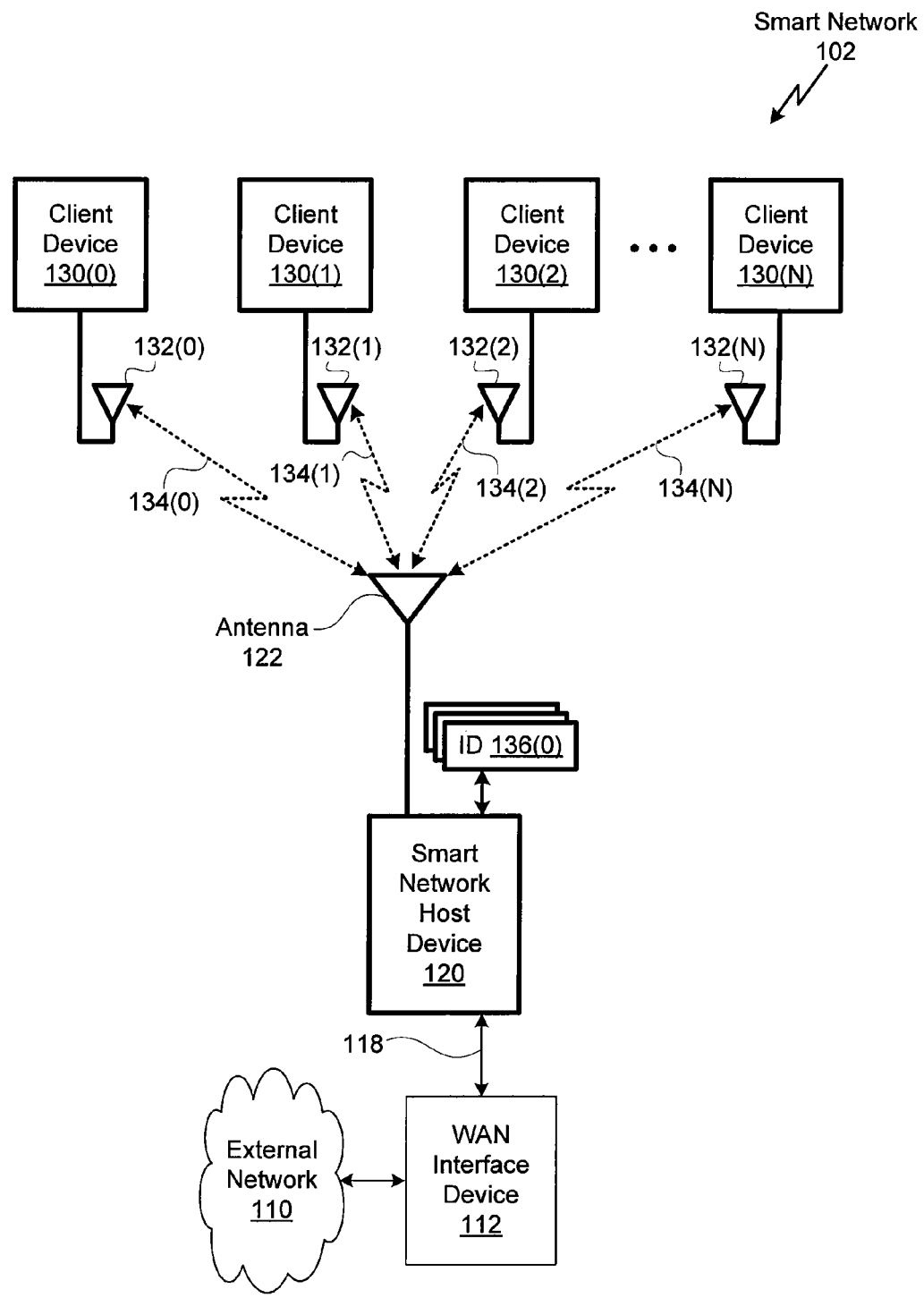
FIG. 1B illustrates the smart home network of FIG. 1A, according to one example embodiment of the present invention.

FIG. 1B illustrates the smart home network 102 of FIG. 1A, according to one example embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present disclosure. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
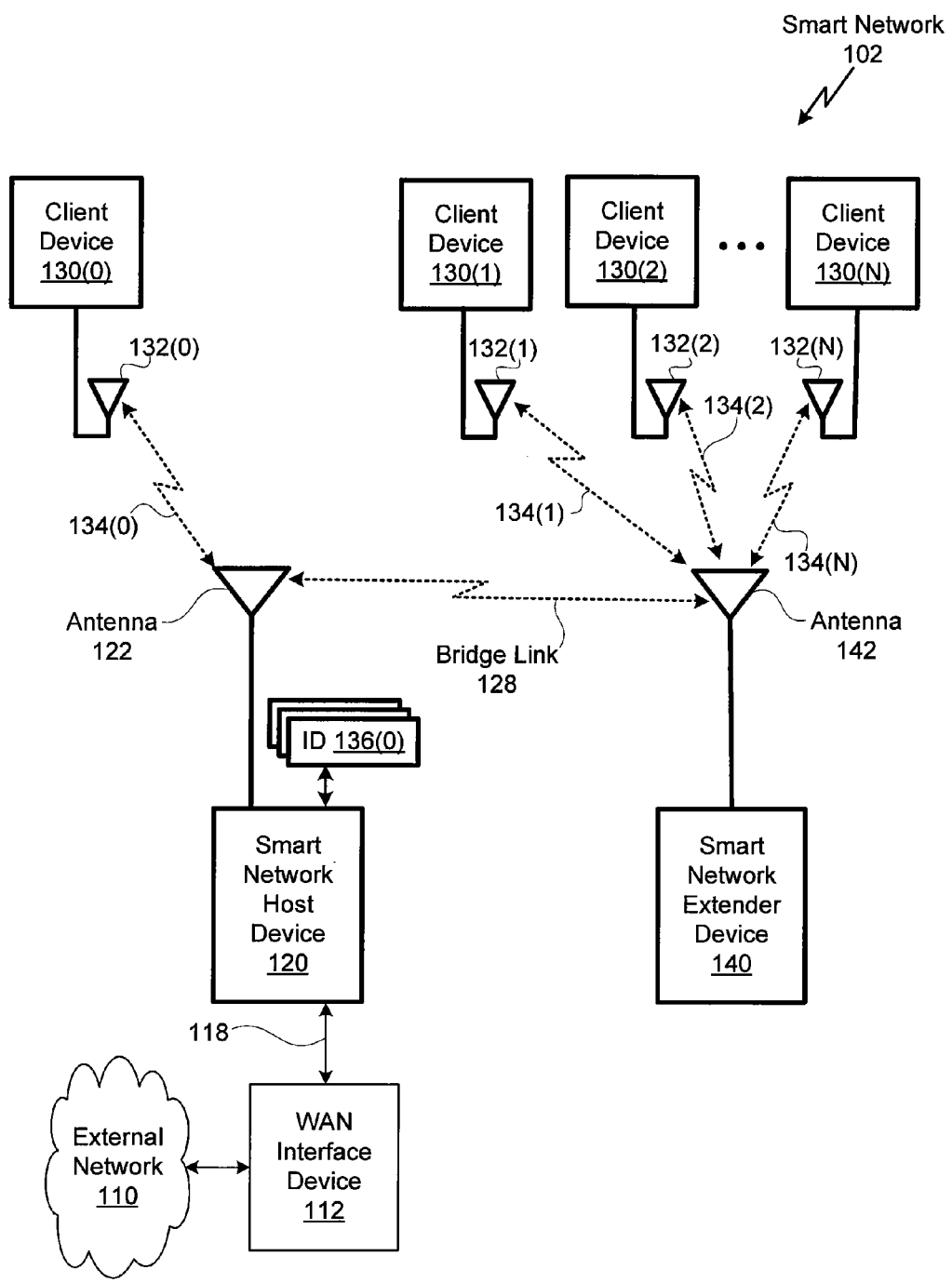
FIG. 1C illustrates the smart home network of FIG. 1A, according to another example embodiment of the present invention.

FIG. 1C illustrates the smart home network 102 of FIG. 1A, according to another example embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
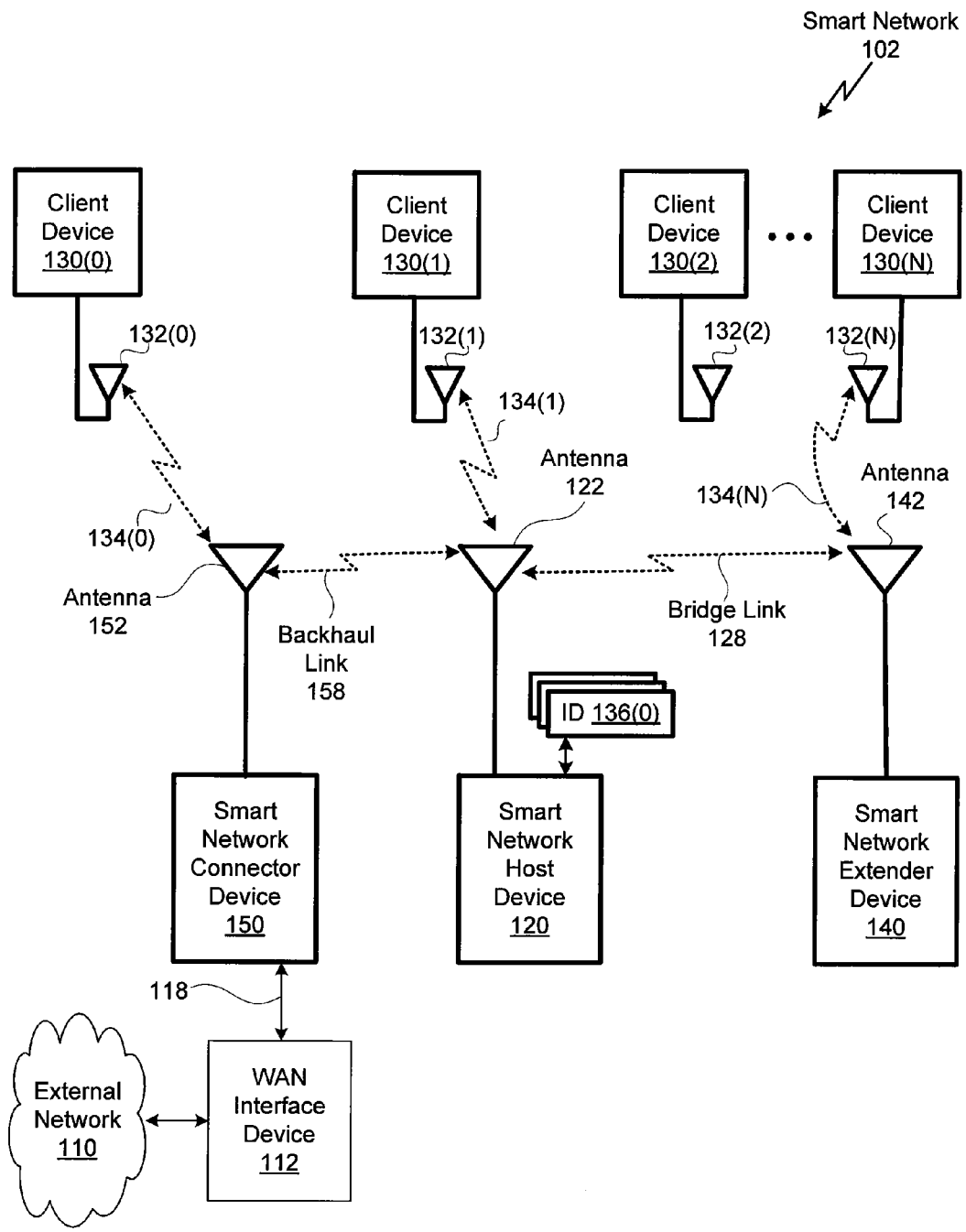
FIG. 1D illustrates the smart home network of FIG. 1A, according to yet another example embodiment of the present invention.

FIG. 1D illustrates the smart home network 102 of FIG. 1A, according to yet another example embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
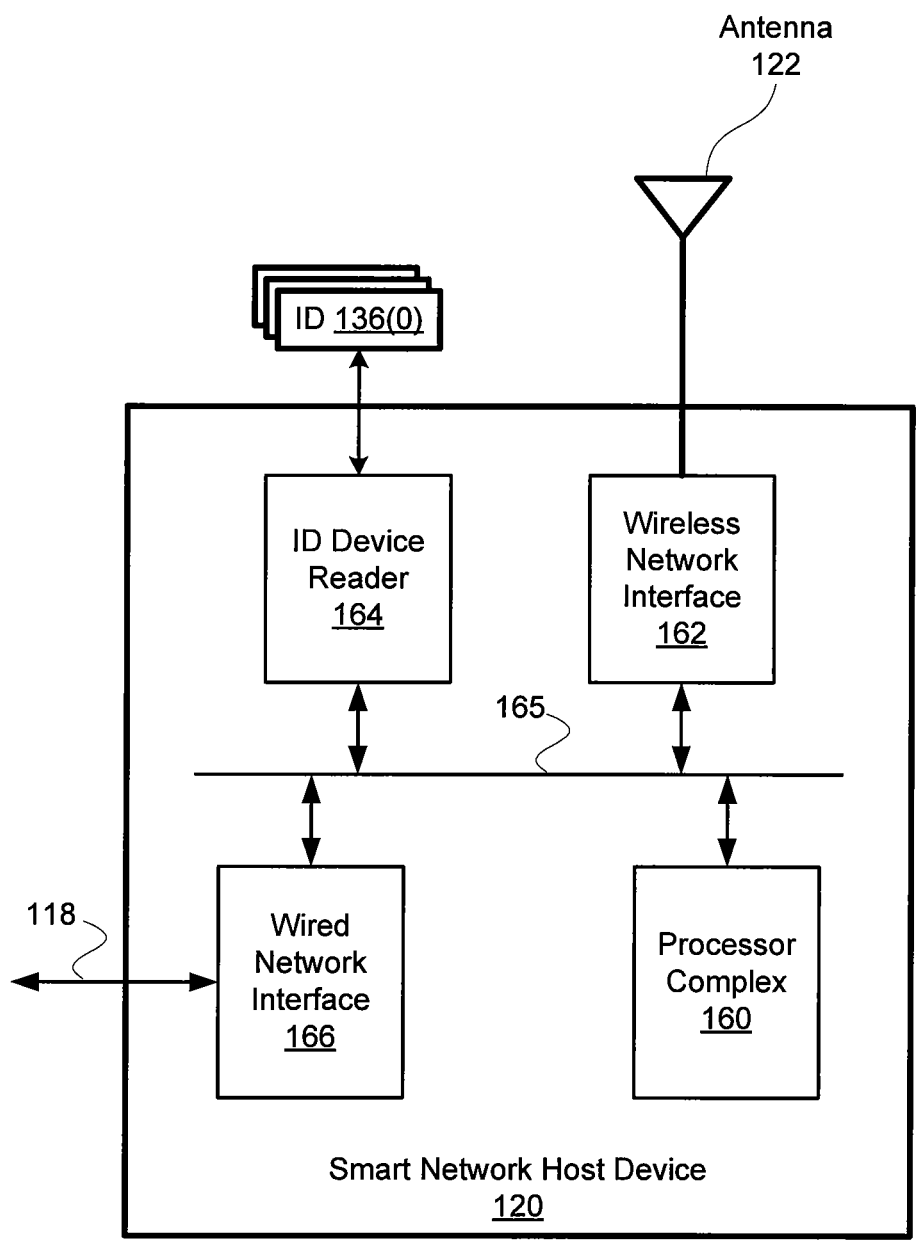
FIG. 1E is a more detailed illustration of the smart network host device of FIG. 1A, according to one example embodiment of the present invention.

FIG. 1E is a more detailed illustration of the smart network host device 120 of FIG. 1A, according to one example embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
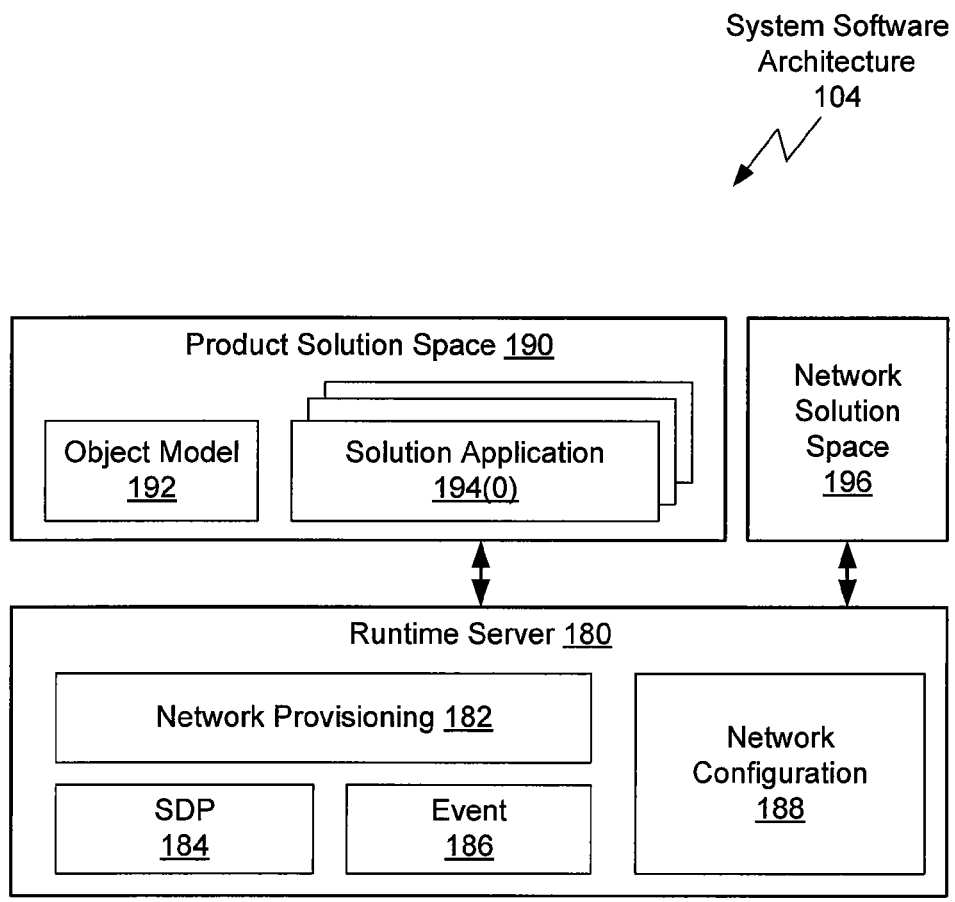
FIG. 1F illustrates a system software architecture for the smart network host device of FIG. 1E, according to one example embodiment of the present invention.

FIG. 1F illustrates a system software architecture for the smart network host device of FIG. 1E, according to one example embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 2:
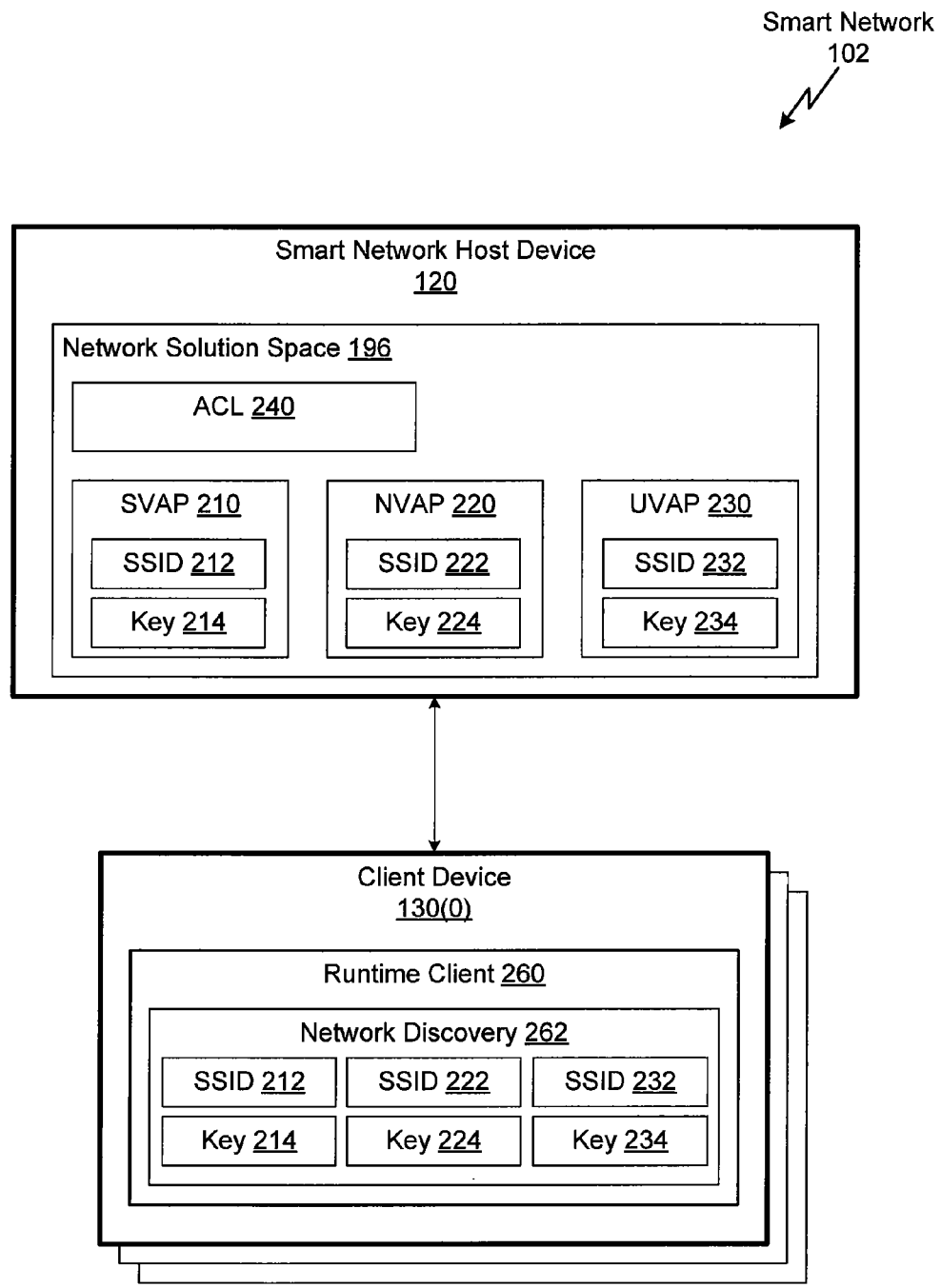
FIG. 2 illustrates a smart network host device configured to enable one or more client devices to automatically reconnect to the smart network, according to one example embodiment of the present invention.

FIG. 2 illustrates a smart network host device 120 configured to enable one or more client devices to automatically reconnect to the smart network 102, according to one example embodiment of the present invention. As shown in FIG. 2, the smart network host device 120 implements a network solution space 196. As described above, network solution space 196 includes one or more software modules configured to provide management of network elements and network services. Network solution space 196 includes one or more virtual access points for client devices 130 to connect to the smart network 102. Each virtual access point is associated with a different service set identifier (SSID) that identifies the virtual access point within the smart network 102. In addition, each virtual access point may implement a security protocol such as WEP, WPA or WPA2 in order to restrict access to the smart network 102 to authenticated devices.

In one embodiment, the smart network host device 120 provides client device 130(0) with a setup virtual access point (SVAP) 210, a network virtual access point (NVAP) 220, and a user virtual access point (UVAP) 230. Each of the virtual access points (210, 220, 230, etc.) may be accessed by one or more client devices 130. The SVAP 210 is associated with an SSID 212 that identifies the virtual access point for client devices 130 within range of antenna 122 of the smart network host device 120. In one embodiment, the smart network host device 120 broadcasts one or more beacon packets that include SSID 212 so client devices 130 can discover the presence of SVAP 210. In alternative embodiments, smart network host device 120 is configured to not broadcast SSID 212 such that SVAP 210 is transparent to users of the smart network 102.

In one embodiment, SVAP 210 may be associated with network credentials such as key 214. Key 214 is a 256-bit encryption key in accordance with the WPA2 protocol. In alternative embodiments, key 214 may be any technically feasible security mechanism configured to restrict access to SVAP 210 to only authenticated devices.

As also shown in FIG. 2, NVAP 220 and UVAP 230 are similar to SVAP 210 except that NVAP 220 is associated with SSID 222 and key 224 and UVAP 230 is associated with SSID 232 and key 234. The smart network host device 120 may be configured to broadcast zero or more SSIDs associated with the one or more virtual access points implemented by the smart network host device 120. For example, the smart network host device 120 may be configured to broadcast the SSID 232 associated with the UVAP 230, but not broadcast SSID 212 or SSID 222 associated with the SVAP 210 and NVAP 220, respectively. Consequently, any user searching for available wireless access points would identify the UVAP 230 based on beacon packets broadcast over the wireless network interface 162, but would not be able to identify the SVAP 210 or the NVAP 220 based on a broadcast SSID.

As also shown in FIG. 2, a client device 130(0) may implement a network discovery module 262 within a runtime client 260 that is configured to facilitate connecting the client device 130(0) with the smart network host device 120. The network discovery module 262 is configured to connect to at least one of the virtual access points (SVAP 210, NVAP 220, UVAP 230, etc.) to connect to the smart network 102. The network discovery module 262 may be configured to store the SSID and network credentials associated with a virtual access point in order to automatically reconnect to that virtual access point whenever the client device 130(0) is within range of the smart network host device 120. As shown, the network discovery module 262 may store SSID 212 and key 214 associated with the SVAP 210, SSID 222 and key 224 associated with the NVAP 220, and SSID 232 and key 234 associated with the UVAP 230.

In one embodiment, the SVAP 210 is associated with a well-known SSID 212 that may be predefined by a manufacturer. For example, every smart network host device 120 produced by a manufacturer may be configured to implement a virtual access point associated with the same SSID such as an "SVAP_home" character string. Initially, when a client device 130(0) has not connected to smart network 102, the client device 130(0) may be configured to attempt to connect to a virtual access point associated with the SVAP_home SSID. In this manner, the client device 130(0) would attempt to connect with any smart network host device 120 within range of the client device 130(0). If a smart network host device 120 is within range, then the client device 130(0) may attempt to authenticate the client device 130(0) with the smart network host device 120 based on network credentials included in ID device 136(0) placed near the smart network host device 120.

The smart network host device 120 enables a client device 130(0) to connect to the SVAP 210; however, the smart network host device 120 may restrict the network traffic transmitted over the connection established with SVAP 210. In one embodiment, the SVAP 210 enables the client device 130(0) to perform one or more setup routines with the smart network host device 120 via a connection established on the SVAP 210. The smart network host device 120 may be configured restrict forwarding of network traffic from the client device 130(0) that is addressed to a destination other than the smart network host device 120. In other words, a client device 130(0) may only use the connection on SVAP 210 to communicate with the smart network host device 120. Initially, a client device 130(0) only stores SSID 212 and key 214, which may be set by the manufacturer during production of the client device 130(0) and are implemented in SVAP 210 on all host devices configured as a smart network host device 120. Once the client device 130(0) discovers SVAP 210, the client device 130(0) may establish a secure connection using key 214. If more than one host device is within range of client device 130(0), then client device 130(0) may attempt to connect to the SVAP 210 corresponding to the strongest wireless signal.

Once a client device 130(0) is connected to the smart network 102 via the SVAP 210, the smart network host device 120 may determine whether an ID device 136(0) corresponding to the client device 130(0) has been introduced to the smart network host device 120. In one embodiment, the ID device 136(0) must be currently in the proximity of the smart network host device 120. In alternative embodiments, the ID device 136(0) merely needs to have been previously introduced to the smart network host device 120. If the client device 130(0) cannot be authenticated on the SVAP 210 corresponding to the strongest wireless signal, then the client device 130(0) may attempt to connect with any other SVAP 210 associated with other smart network host devices 120 within range of the client device 130(0). Alternatively, the client device 130(0) may indicate to a user that the client device 130(0) cannot connect to a smart network 102.

In one embodiment, the smart network host device 120 may track all ID devices 136 placed in proximity to the ID device reader 164 and may add entries corresponding to each ID device 136 to an access control list (ACL) 240 stored in the network solution space 196. Each entry may include a unique identifier (UID) connected to a particular client device 130(0) as well as credentials associated with that client device 130(0). The UID and credentials may be retrieved from the corresponding ID device 136(0). If the smart network host device 120 determines that the ID device 136(0) has not been introduced to the smart network host device 120, then the smart network host device 120 may terminate the connection established via the SVAP 210 and the client device 130(0) may attempt to locate a different SVAP provided by a different host device. However, if the smart network host device 120 determines that the ID device 136(0) has been introduced to the smart network host device 120, then the smart network host device 120 may transmit the SSID 222 and key 224 corresponding to the NVAP 220 to the client device 130(0) and the client device 130(0) may attempt to establish a connection with the NVAP 220. In one embodiment, an entry is added to the ACL 240 when an ID device 136(0) is placed near the ID device reader 164 for the first time. Once the entry has been added to the ACL 240, then the client device 130(0) associated with the ID device 136(0) becomes an authenticated device and is allowed to reconnect to the smart network 102, even if the ID device 136(0) is no longer in proximity to the ID device reader 164. In alternative embodiments, a user may explicitly remove an entry from the ACL 240 in order to disassociate a client device 130(0) from the smart network 102. In yet other embodiments, when an ID device 136(0) is removed from the proximate location of the ID device reader 164, a corresponding entry will also be removed from the ACL 240 in order to disassociate the corresponding client device 130(0) from the smart network 102.

The SSID 222 and key 224 are unique to each smart network host device 120 and cannot be changed by a user. In one embodiment, the SSID 222 is generated by concatenating a well-known character string such as "NVAP_home" with a randomly generated character string associated with the smart network host device 120. For example, SSID 222 may be "NVAP_home_12ae74d823" that includes the well-known character string "NVAP_home" and the randomly generated character string "_12ae74d83". In alternative embodiments, SSID 222 may be generated using only a randomly generated character string.

Once a client device 130(0) has connected to the smart network 102 and has been authenticated via a corresponding ID device 136(0), the client device 130(0) is a trusted device and may connect to the NVAP 220. Some client devices 130 may be configured to transmit normal network traffic via a secure connection established on the NVAP 220. For example, some thin client devices 130 may not include any type of user interface that would enable a user to enter any network credentials created by a user. In such cases, the embedded client device may be permitted to transmit normal network traffic to one or more other client devices 130 connected to the smart network 102

In other cases, client devices 130 may be configured to connect to UVAP 230 that is associated with SSID 232 and key 234, which may be configured by a user. In one embodiment, a user may use computer 170 to connect to the smart network host device 120 and generate SSID 232. A user may similarly generate key 234. For example, a user may choose an SSID that is easily remembered such as "Janes_Network". Also, the user may choose a password that, when processed by a key derivation function (KDF), generates key 234. For example, the WEP, WPA, and WPA2 protocols define methods and requirements for the format and selection of authentication keys. Many client devices 130, such as laptop computers or gaming consoles, may require a user to enter the SSID 232 and key 234 in order to connect to the smart network 102. Such client devices 130 may not be associated with an ID device 136 and instead must only connect to UVAP 230 via the user generated SSID 232 and key 234. In alternative embodiments, a user may authenticate some client devices by alternative means such as passing network credentials between the smart network host device 120 and the client device 130(0) using a USB™ key or other technically feasible solution.

In a home wireless network environment, a user may change the SSID and/or network credentials periodically in order to better secure the wireless network. Typically, when the user changes the SSID or network credentials, a user must manually reconnect each client device 130 previously connected to the wireless network. However, when a client device 130(0) is configured to be connected to the smart network 102, the client device 130(0) may be configured to automatically reconnect to the smart network using either the NVAP 220 or the SVAP 210.

In one embodiment, when a client device 130(0) loses a connection to the UVAP 230, such as when a user has changed the network credentials associated with the UVAP 230 or when the client device 130(0) roams between wireless networks and only stores the most recent wireless network credentials to which the client device was connected, the client device 130(0) may be configured to automatically reconnect to NVAP 220 and retrieve the SSID 232 and key 234 associated with UVAP 230. In other embodiments, the client device 130(0) may be configured to automatically reconnect to the SVAP 210 instead of the NVAP 220. In yet other embodiments, a client device 130(0) may be configured to first attempt to connect to the NVAP 220 and, if that connection fails, then to attempt to connect to the SVAP 210.

For example, many client devices 130 are mobile and may roam between multiple wireless networks. Cell phones are good examples of such devices. A client device 130(0) may be configured to only store the most recent SSID 232 and key 234 associated with the latest user lever wireless access point, such as a public wireless access point. Thus, when a user connects to the public wireless access point (e.g., a public Wi-Fi network hosted by a local coffee shop), the SSID 232 and key 234 associated with the smart network 102 may be replaced with the SSID and key associated with the public wireless access point. Then, when the user returns home, the client device 130(0) no longer includes the stored SSID 232 and key 234 associated with the UVAP 230. Thus, the client device 130(0) may be configured to automatically fall-back to attempt to reconnect to the NVAP 220 or SVAP 210 in order to retrieve the SSID 232 and key 234 associated with the smart network 102. Because the particular client device 130(0) has been previously authenticated with the smart network 102, the smart network host device 120 may transmit the new SSID 232 and new key 234 to the client device 130(0) via the connection established on the NVAP 220 or the SVAP 210. Consequently, the client device 130(0) automatically reestablishes a connection with the UVAP 230 implemented on the smart network host device 120 without user intervention.

Figure 3:
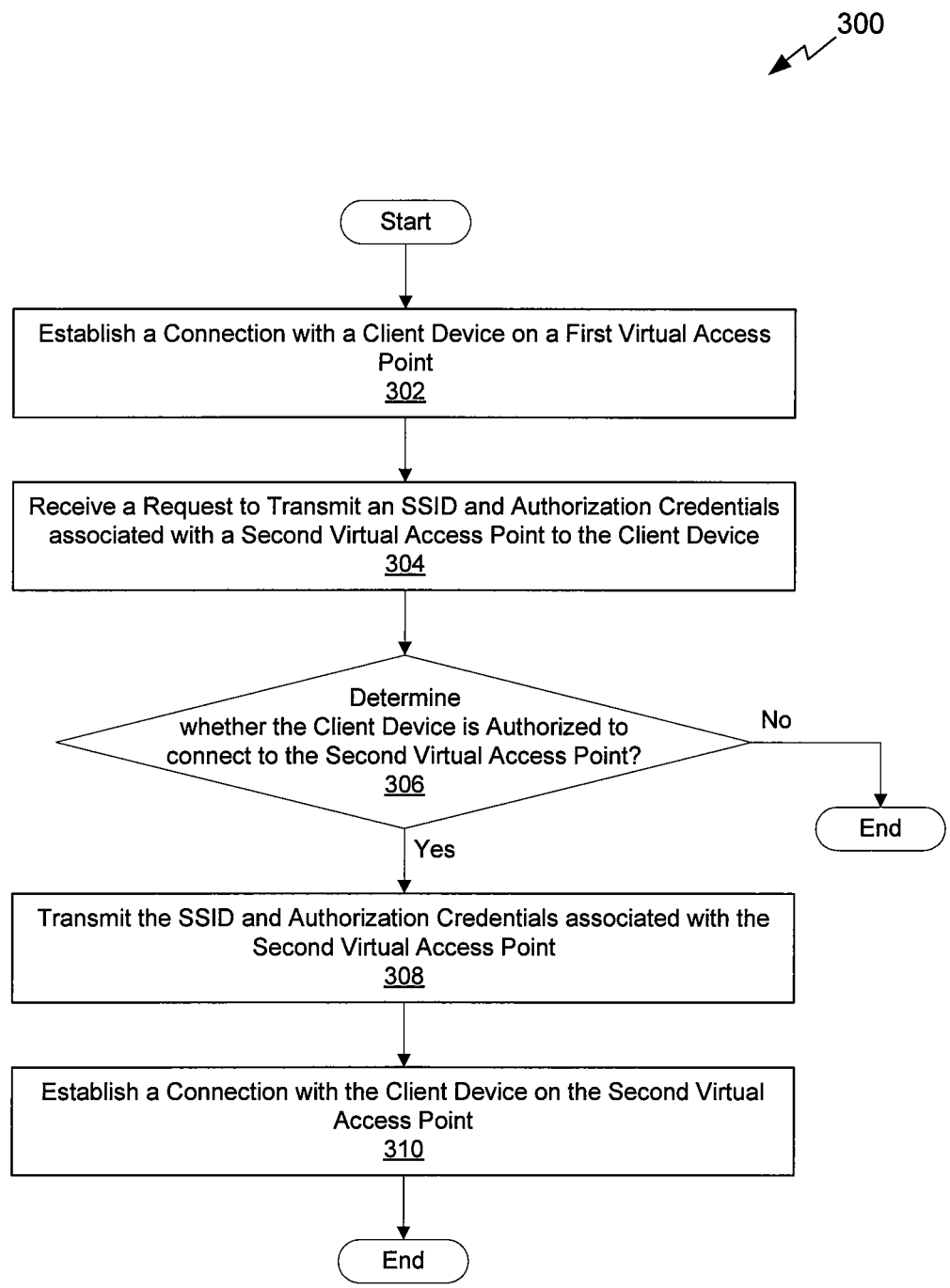
FIG. 3 is a flowchart of method steps for reestablishing a connection to a client device, according to one example embodiment of the present invention.

FIG. 3 is a flowchart of method steps 300 for reestablishing a connection to a client device 130(0), according to one example embodiment of the present invention. Although the method steps are described in conjunction with the network system 100 of FIGS. 1A-1F and 2, persons skilled in the art will understand that any network system configured to perform the method steps, in any order, is within the scope of the invention.

As shown, the method 300 begins at step 302, where a smart network host device 120 establishes a connection with a client device 130(0) on a first virtual wireless access point. In one embodiment, the smart network host device 120 implements three virtual wireless access points: SVAP 210, NVAP 220 and UVAP 230. Client devices 130 normally connect to either NVAP 220 (e.g., embedded devices without a user interface) or UVAP 230 (e.g., client devices that include a user interface). When a client device 130(0) finds that the virtual wireless access point to which the device normally connects (i.e., the NVAP 220 or the UVAP 230, as the case may be) is not available, the client device 130(0) may be configured to automatically reconnect to a different virtual access point implemented by the smart network host device 120. For example, an embedded client device 130(0) may fall-back to attempt to establish a connection with the SVAP 210, or a client device 130(0) that normally connects with the UVAP 230 may attempt to establish a connection with the NVAP 220 or the SVAP 210.

At step 304, the smart network host device 120 receives a request to transmit an SSID as well as authorization credentials associated with a second virtual wireless access point. In one embodiment, a client device 130(0) may store the SSID 212 and key 214 associated with the SVAP 210 and, in the event that the client device 130(0) cannot connect to the UVAP 230 or the NVAP 220, the client device 130(0) may establish a connection with the smart network host device 120 via the SVAP 210 and send a message to the smart network host device 120 that requests the smart network host device 120 to transmit the SSID and authorization credentials associated with either the NVAP 220 or the UVAP 230 to the client device 130(0).

At step 306, the smart network host device 120 determines whether the client device 130(0) is authorized to connect to the second virtual wireless access point. In one embodiment, the smart network host device 120 may compare information associated with the client device 130(0), such as a MAC address corresponding to the wireless network interface of the client device 130(0), with the entries in an access control list (ACL) that tracks trusted devices that have previously been authorized to connect to the smart network 102. In alternative embodiments, the smart network host device 120 may be configured to determine whether an ID device 136(0) that corresponds to the client device 130(0) is in proximity to the ID device reader 164 of the smart network host device 120. If the smart network host device 120 determines that the client device 130(0) is not authorized to connect to the second virtual wireless access point, then the smart network host device 120 terminates the connection with the client device 130(0) and method 300 terminates. However, if the smart network host device 120 determines that the client device 130(0) is authorized to connect to the second virtual wireless access point, then method 300 proceeds to step 308 where the smart network host device 120 transmits the SSID and authorization credentials corresponding to the second virtual wireless access point to the client device 130(0). In one embodiment, the connection established in step 302 is a secure connection and, therefore, the SSID and authorization credentials transmitted to the client device 130(0) are encrypted. At step 310, the smart network host device 120 establishes a connection with the client device 130(0) on the second virtual access point. In one embodiment, the client device 130(0) establishes a connection with the NVAP 220 or the UVAP 230, as the case may be, using the SSID and authorization credentials received in step 308. Once the new connection is established, method 300 terminates.

In sum, example embodiments of the invention provide systems and methods for enabling client devices to automatically and seamlessly reconnect to a wireless network whenever the client device roams between different wireless networks or a user changes the network credentials associated with a wireless access point. A wireless network host device may track which client devices are authorized to connect to the wireless network. A client device configured to connect to a wireless network may store network credentials to connect to the wireless access point. If those network credentials are changed by an administrator of the wireless network, or the client device is configured to connect to a different wireless network (even though the client device is authorized to connect to this wireless network), then the client device may connect to the wireless access point via a virtual access point configured to enable the client device to request the network credentials associated with the wireless access point.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the disclosure may be devised without departing from the basic scope thereof. Therefore, the scope of the present invention is determined by the claims that follow.

We claim:

1. A method, comprising:
   establishing a connection between a wireless access point and a client device via a first virtual access point that is associated with a first service set identifier (SSID) and a first authentication key;
   receiving a request to transmit to the client device a second SSID and a second authentication key that are associated with a second virtual access point;
   determining whether the client device is authorized to connect to the second virtual access point; and
   upon determining that the client device is authorized to connect to the second virtual access point:
      upon determining that the client device does not have a user interface to enter network credentials, transmitting to the client device, in response to the request, a third SSID and a third authentication key associated with a third virtual access point to enable the client device to connect to the third virtual access point; and
      upon determining that the client device does have the user interface to enter network credentials, transmitting, in response to the request, the second SSID and the second authentication key to the client device to enable the client device to connect to the second virtual access point.

2. The method of claim 1, wherein the wireless access point broadcasts the second SSID and the third SSID to any client devices within range of the wireless access point, the method further comprising:
   receiving the first SSID and the first authentication key from the client device prior to establishing the connection between the wireless access point and the client device.

3. The method of claim 1, wherein the first SSID comprises a setup virtual access point configured to enable the client device to communicate only with the wireless access point, wherein the second SSID comprises a user virtual access point configured to enable the client device to communicate with computing devices on networks external to the wireless access point, and wherein the third virtual access point comprises a network virtual access point configured to enable the client to communicate only with devices connected to the wireless access point, the method further comprising:
   upon transmitting the second SSID and the second authentication key to the client device, establishing a new connection between the wireless access point and the client device via the second virtual access point; and
   upon transmitting the third SSID and the third authentication key to the client device, establishing a new connection between the wireless access point and the client device via the third virtual access point.

4. The method of claim 3, wherein the second authentication key provides a basis for securing the new connection, wherein the first authentication key and the first SSID are set in the client device and the wireless access point during the manufacturing process, wherein determining whether the client device is authorized to connect to the second virtual access point comprises at least one of: (i) determining that an ID device of the client device is in proximity to an ID device reader of the wireless access point, and (ii) determining whether the access control list of the wireless access point contains a record associated with the client device.

5. The method of claim 1, further comprising:
   creating a record for the client device in the access control list of the wireless access point upon determining that the ID device of the client device is in proximity to the ID device reader of the wireless access point.

6. The method of claim 5, wherein the first SSID and the first authentication key cannot be modified.

7. The method of claim 1, further comprising:
subsequent to the client device losing the new connection, detecting an attempt by the client device to reconnect to a selected one of the second SSID and the third SSID;
determining that the client device does not provide at least one of the SSID and the authentication key of the selected one of the second SSID and the third SSID;
causing the client device to connect to the first SSID using the first authentication key; and
transmitting the SSID and the authentication key of the selected one of the second SSID and the third SSID to enable the client device to connect to the second or third virtual access point.

8. A non-transitory computer-readable medium including instructions that, when executed by a processing unit, cause the processing unit to perform the steps of:
establishing a connection between a wireless access point and a client device via a first virtual access point that is associated with a first service set identifier (SSID) and a first authentication key;
receiving a request to transmit to the client device a second SSID and a second authentication key that are associated with a second virtual access point;
determining whether the client device is authorized to connect to the second virtual access point; and
upon determining that the client device is authorized to connect to the second virtual access point:
upon determining that the client device does not have a user interface to enter network credentials, transmitting to the client device, in response to the request, a third SSID and a third authentication key associated with a third virtual access point to enable the client device to connect to the third virtual access point; and
upon determining that the client device does have the user interface to enter network credentials, transmitting, in response to the request, the second SSID and the second authentication key to the client device to enable the client device to connect to the second virtual access point.

9. The non-transitory computer-readable medium of claim 8, wherein the wireless access point broadcasts the second SSID and the third SSID to any client devices within range of the wireless access point, the steps further comprising:
receiving the first SSID and the first authentication key from the client device prior to establishing the connection between the wireless access point and the client device.

10. The non-transitory computer-readable medium of claim 8, wherein the first SSID comprises a setup virtual access point configured to enable the client device to communicate only with the wireless access point, wherein the second SSID comprises a user virtual access point configured to enable the client device to communicate with computing devices on networks external to the wireless access point, and wherein the third virtual access point comprises a network virtual access point configured to enable the client to communicate only with devices connected to the wireless access point, the steps further comprising:
upon transmitting the second SSID and the second authentication key to the client device, establishing a new connection between the wireless access point and the client device via the second virtual access point; and
upon transmitting the third SSID and the third authentication key to the client device, establishing a new connection between the wireless access point and the client device via the third virtual access point.

11. The non-transitory computer-readable medium of claim 10, wherein the second authentication key provides a basis for securing the new connection, wherein the first authentication key and the first SSID are set in the client device and the wireless access point during the manufacturing process, wherein determining whether the client device is authorized to connect to the second virtual access point comprises at least one of: (i) determining that an ID device of the client device is in proximity to an ID device reader of the wireless access point, and (ii) determining whether the access control list of the wireless access point contains a record associated with the client device.

12. The non-transitory computer-readable medium of claim 8, the steps further comprising:
creating a record for the client device in the access control list of the wireless access point upon determining that the ID device of the client device is in proximity to the ID device reader of the wireless access point.

13. The non-transitory computer-readable medium of claim 12, wherein the first SSID and the first authentication key cannot be modified.

14. The non-transitory computer-readable medium of claim 8, the steps further comprising:
subsequent to the client device losing the new connection, detecting an attempt by the client device to reconnect to a selected one of the second SSID and the third SSID;
determining that the client device does not provide at least one of the SSID and the authentication key of the selected one of the second SSID and the third SSID;
causing the client device to connect to the first SSID using the first authentication key; and
transmitting the SSID and the authentication key of the selected one of the second SSID and the third SSID to enable the client device to connect to the second or third virtual access point.

15. A system, comprising:
a client device; and
a wireless access point that implements two or more virtual access points and is configured to:
establish a connection between the wireless access point and the client device via a first virtual access point that is associated with a first service set identifier (SSID) and a first authentication key;
receive a request to transmit to the client device a second SSID and a second authentication key that are associated with a second virtual access point;
determine whether the client device is authorized to connect to the second virtual access point; and
upon determining that the client device is authorized to connect to the second virtual access point:
upon determining that the client device does not have a user interface to enter network credentials, transmit to the client device, in response to the request, a third SSID and a third authentication key associated with a third virtual access point to enable the client device to connect to the third virtual access point; and
upon determining that the client device does have the user interface to enter network credentials, transmit, in response to the request, the second SSID and the second authentication key to the client device to enable the client device to connect to the second virtual access point.

16. The system of claim 15, wherein the wireless access point broadcasts the second SSID and the third SSID to any client devices within range of the wireless access point, the wireless access point further configured to:

receive the first SSID and the first authentication key from the client device prior to establishing the connection between the wireless access point and the client device.

17. The system of claim 15, wherein the first SSID comprises a setup virtual access point configured to enable the client device to communicate only with the wireless access point, wherein the second SSID comprises a user virtual access point configured to enable the client device to communicate with computing devices on networks external to the wireless access point, and wherein the third virtual access point comprises a network virtual access point configured to enable the client to communicate only with devices connected to the wireless access point, the wireless access point further configured to:

upon transmitting the second SSID and the second authentication key to the client device, establish a new connection between the wireless access point and the client device via the second virtual access point; and upon transmitting the third SSID and the third authentication key to the client device, establish a new connection between the wireless access point and the client device via the third virtual access point.

18. The system of claim 15, wherein the first authentication key and the first SSID are set in the client device and the wireless access point during the manufacturing process, wherein determining whether the client device is authorized to connect to the second virtual access point comprises at least one of: (i) determining that an ID device of the client device is in proximity to an ID device reader of the wireless access point, and (ii) determining whether the access control list of the wireless access point contains a record associated with the client device.

19. The system of claim 18, the wireless access point further configured to:

create a record for the client device in the access control list of the wireless access point upon determining that the ID device of the client device is in proximity to the ID device reader of the wireless access point.

20. The system of claim 15, wherein the first SSID and the first authentication key cannot be modified, the wireless access point further configured to subsequent to the client device losing the new connection, detect an attempt by the client device to reconnect to a selected one of the second SSID and the third SSID;

determine that the client device does not provide at least one of the SSID and the authentication key of the selected one of the second SSID and the third SSID;

cause the client device to connect to the first SSID using the first authentication key; and transmit the SSID and the authentication key of the selected one of the second SSID and the third SSID to enable the client device to connect to the second or third virtual access point.

21. A method, comprising:

establishing a connection between a wireless access point and a client device via a first virtual access point that is associated with a first service set identifier (SSID) and a first authentication key;

receiving a request to transmit to the client device a second SSID and a second authentication key that are associated with a second virtual access point;

determining whether the client device is authorized to connect to the second virtual access point based an ID device of the client device being in proximity to an ID device reader of the wireless access point; and upon determining that the client device is authorized to connect to the second virtual access point:

upon determining that the client device does not have a user interface to enter network credentials, transmitting to the client device, in response to the request, a third SSID and a third authentication key associated with a third virtual access point to enable the client device to connect to the third virtual access point; and upon determining that the client device does have the user interface to enter network credentials, transmitting, in response to the request, the second SSID and the second authentication key to the client device to enable the client device to connect to the second virtual access point.

* * * * *